Crosby E. Fentress
INVENTOR.

Crosby E. Fentress
INVENTOR.

United States Patent Office 3,526,372
Patented Sept. 1, 1970

3,526,372
EXPANDING CENTER PROBE AND DROGUE
T. O. Paine, Acting Administrator of the National Aeronautics and Space Administration, in respect to an invention of Crosby E. Fentress, Santa Monica, Calif.
Filed Feb. 27, 1969, Ser. No. 802,816
Int. Cl. B64g 1/00
U.S. Cl. 244—1                                              7 Claims

ABSTRACT OF THE DISCLOSURE

A cooperating probe and drogue assembly for mechanically linking respective space vehicles upon completion of rendezvous maneuvers. The probe, which is mounted at an end of one of the vehicles, is characterized by a telescoping boom which is extended or retracted by a plurality of arms mounted thereon. The end of the boom carries a contact head having capture latches which are adapted to engage an cooperating drogue mechanism on the rear of a target vehicle. Subsequent to initial coupling of the vehicles the boom is retracted so as to bring the vehicles into full abutting contact whereupon they are structurally locked to one another.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

This invention relates to an apparatus for effecting rendezvous and docking in space between two or more space vehicles. More particularly the invention is directed to a mechanical assembly on one vehicle which is adapted to sense, contact, and lock into a cooperating mechanical assembly on another vehicle.

In the exploration of outer space by manned vehicles substantial amounts of fuel must be carried on board the booster vehicle to merely place it in orbit about the earth. Sequential stages of rockets are therefore conventionally combined and sequentially ignited while burnt out stages are jettisoned in order to reduce the weight of the rocket to be put into orbit. Similar savings in weight are planned in the future when the actual exploration of planetary bodies is initiated. This savings is contemplated by separating from the orbiting vehicle a section thereof which, by manned operation, will explore a planetary body proximate to the orbiting vehicle. In this way the parent vehicle can conserve fuel by remaining in orbit with its engines shut down while the smaller vehicle, requiring a much lesser amount of fuel, descends to the surface of the planet to be explored. Upon completion of the exploratory mission the smaller vehicle ascends from the planet to the parent vehicle thereupon "docking" of the two vehicles takes place. It will be recognized that docking of interplanetary space vehicles may be required under numerous other types of circumstances such as for the transference of cargo, personnel, or the making of repairs to stranded vehicles. Whatever the purpose, it is apparent that the docking procedure, and the cooperating mechanism in each of the respective vehicles utilized for such docking, are of extreme importance in the successful completion of the mission.

A number of factors and restraints must be recognized in the design of a docking mechanism. Generally only one of the vehicles, namely the pursuit vehicle, or as referred to in the above example, the planetary exploration vehicle, is moving during the docking procedure. The parent or target vehicle remains substantially motionless relative to the pursuit vehicle. Therefore, in approaching the target vehicle, particular caution and skill is exercised by the pilot of the pursuit vehicle in order to contact the target vehicle in an area defined by a reception funnel or drogue assembly. The drogue assembly is adapted to receive the contacting and coupling mechanism of the probe of the pursuit vehicle. Also, it will be recognized that if the closing velocity between the two vehicles is too great, excessive contacting forces may be imparted to the probe thereby destroying or damaging it. Numerous other considerations such as the reliability of the locking mechanism of the probe once contact is made and the overall weight of the probe are important.

SUMMARY OF THE INVENTION

In light of the above, the present invention discloses a probe assembly for mechanically coupling or "docking" one space vehicle to a drogue assembly or receptacle area on another space vehicle. The drogue assembly is characterized by a mechanically expandable and retractable probe which enables the operator to contact or lock into the drogue of the target vehicle after he has maneuvered his vehicle into contacting range. When the probe engages the drogue through a plurality of capture latches, the probe is retracted so as to pull the pursuit vehicle and the target vehicle towards one another. Upon contact, the vehicles are automatically secured to one another so as to complete the docking procedure. The probe assembly itself may then be removed so as to enable transference between the interfaced vehicles. Therefore, one of the primary features and advantages of this invention resides in its portability and ease of operation.

Another particular feature and advantage of the invention resides in the provision for a telescoping probe mechanism constructed so as to enable attenuation of energy which is axially imposed upon contact by two bodies.

A further feature and advantage of the invention is the provision for a shock attenuating means to absorb forces which a probe would normally sustain at non-axial angles upon contact with another body.

Still another feature and advantage of the invention resides in the provision for an initial latching mechanism for connecting vehicles at an extended distance so as to thereby enhance pilot visibility and general observation during the subsequent actual physical coupling of the vehicles.

BRIEF DESCRIPTION OF THE DRAWINGS

These and numerous other features and advantages of the invention will become apparent upon a reading of the following detailed description, claims, and drawings, wherein like numerals denote like parts in the several views, and wherein:

DETAILED DESCRIPTION

Figure 1:
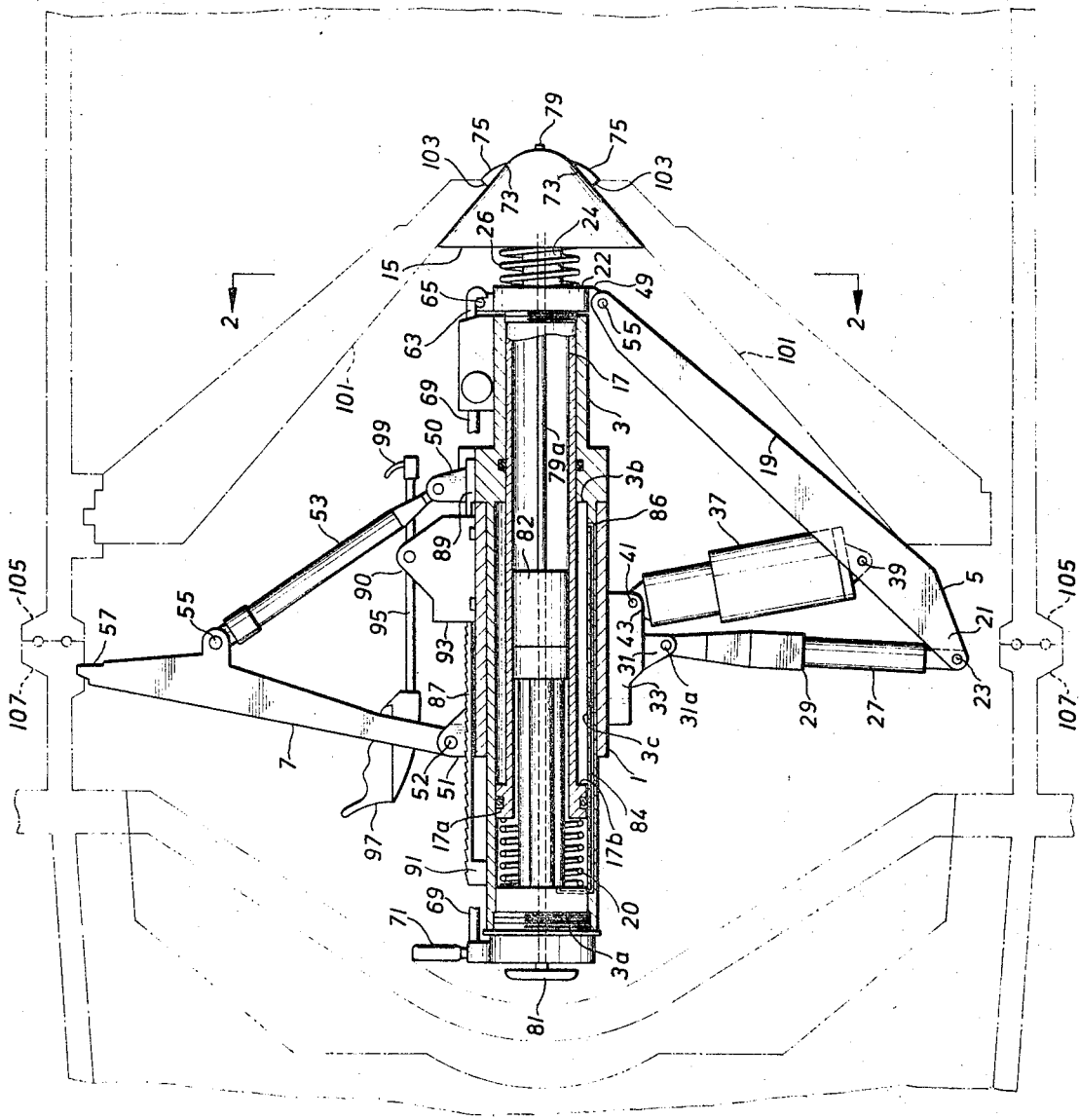
FIG. 1 is a view in partial cross-section along the longitudinal axis of the probe assembly of the invention showing the relative positions of the components when the probe is installed and ready for actuation.

As briefly noted above, the docking probe assembly provides for initial vehicle coupling and is constructed so as to attenuate impact energy imposed by vehicle contact. The assembly, as illustrated in the drawings, basically consists of the cylinder 3, the primary collar 1 movably mounted thereon, and a spring loaded piston 17 disposed within the cylinder and which carries on one end thereof the probe head 15 for contacting the target vehicle. Additionally there is provided a plurality of at least three hinged pitch arm assemblies 5 which serve to attenuate impact energy upon contact between the vehicles. The probe assembly is supported in an opening of the pursuit vehicle by a tripod-like support structure referred to as the hinged beam assemblies 7.

The cylinder 3 is characterized by a rearward shoulder surface on which is slidably received the primary collar 1. The collar serves to support the rear connections of each of the three pitch arm assemblies 5 and also each of the three hinged beam assemblies 7. Slidably disposed within the cylinder 3 is the spring loaded piston 17. The piston is characterized by a radially directed flange 17a at its rearward end. The rearward end of the flange itself is adapted to receive in abutting manner one end of spring 20. The spring is normally disposed in a compressed manner within the cavity defined by face 3a of cylinder 3 and the rearward edge of flange 17a. The forward portion of cylinder 3 is also characterized by an internal radially directed flange 3b dimensionally constructed so as to create an enclosed annular cavity of rectangular configuration. The cavity itself is defined by the forward surface 17b of flange 17a, flange 3b, the external surface of piston 17 and the internal recessed surface 3c of cylinder 3. The annular cavity, as more fully explained hereinafter, is hermetically protected by a plurality of O-rings (not numbered) in both the cylinder and the piston since it is the function of the cavity to receive a compressed fluid, the pressure of which bears upon the aforementioned walls of the cavity when it is desired to retract the probe.

Figure 2:
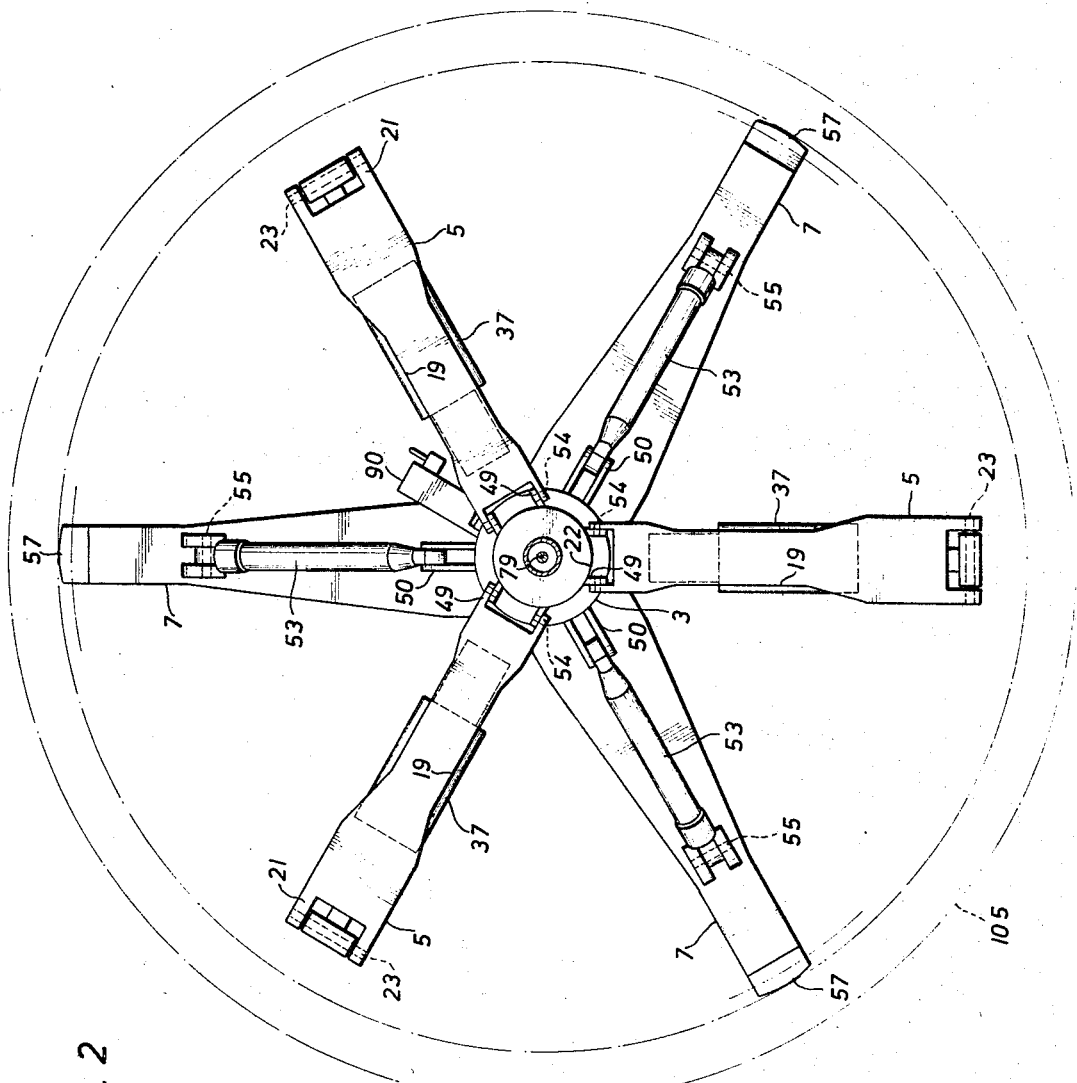
FIG. 2 is a view of the probe assembly taken along the plane 2—2 of FIG. 1.

The forward end of piston 17 threadedly engages a piston cap 22. Integrally connected to the piston cap are a plurality (three) pairs of radial ears 49. As best shown in FIG. 2, the radial ears are equidistantly spaced in circumferential manner about the cap surface. The ears are adapted to receive in hinged manner the forward end of the pitch arm assemblies 5. The connection is achieved by conventional hinge pins 55 which are inserted through apertures of the yoke formed by the pairs of ears 49. The rearward connection of pitch arm assemblies 5 is effected by a plurality of (3) ear members 33 integrally formed or fixedly connected to the primary collar 1. The ear members 33 are circumferentially disposed about the surface of the collar so as to be in longitudinal alignment with the radial ears 49 on piston cap 22. Each of the ear members is characterized by a pair of upper ears 31 and a pair of lower ears 43. The upper ears are adapted to receive the rearward portion of one of the pitch arm assemblies 5. This connection is effected by means of a hinge pin 31a which fits into the yoke formed by the upper ears in much the same manner as the hinge pin 55 does with radial ears 49 on the piston cap.

Each of the three pitch arm assemblies 5 serve, as previously explained, to attenuate forces imparted to the probe assembly upon impact with the target vehicle. Because of the equi-spaced circumferential positioning of the pitch arm assemblies it will be recognized that non-axial forces can be effectively absorbed and successfully transferred to primary collar 1 and hence to cylinder 3 so that in effect these two components remain in axial alignment with one another so as to thereby preserve the operational effectiveness of the probe assembly. The pitch arm assemblies 5 each comprise a main beam section 19 having the forward end thereof hingedly connected to the radial ears 49 and the rearward end thereof hingedly connected by pin means 23 to the tension link 27. The tension link, which is essentially a tension shock absorbing piston is connected via a pitch control yoke assembly 29 to the aforementioned upper ears 31 by the pin 31a. Hingedly connected intermediate the ends of main beam section 19 is a shock absorber or attenuator assembly 37. The attenuator assembly 37 is connected, at its upper end, to the main beam by a hinge pin 39, and at its lower end to the lower ears 43 by a hinge pin 41. The pitch arms, tension linkage, and shock attenuators in combination induce the required kinematics causing the compression of the attenuator assemblies and hence the subsequent reduction of forces to the level necessary to meet docking requirements.

Support of the probe assembly is provided by a tripod structure consisting of three hinged beam assemblies 7 which are equidistantly spaced around the circumference of the primary collar 1 and cylinder 3. Each of the beam assemblies are supported on the primary collar 1 by a yoke and pin arrangement that includes a pair of ears 51 and axial pin 52, see FIG. 1. Proximate the outer forward end of each hinged beam assembly is a pair of connection ears 55 to which is attached a strut 53. The strut is in turn attached at its forward end to the piston in a hinged manner by pin means which extend through a pair of radially extending ears 50. It will be recognized that the ears 50 on the cylinder and ears 51 on the collar are axially aligned with respect to one another. The distal end of each hinged beam assembly 7 is characterized by a locking shoulder 57 configured to engage a cooperating recessed shoulder in the wall of the pursuit vehicle. It will be recognized, with reference to FIG. 1, that as cylinder 3 moves forwardly with respect to primary collar 1, the hinged beam assemblies 7 will also tend to move forwardly about hinge pins 52, thus reducing the radial distance of locking shoulder 57 from the axis of the probe and thereby causing disengagement of the probe from the vehicle. As may be seen from FIG. 2, the tripod support structure consisting of the hinged beam assemblies 7 not only locates the probe assembly in fixed manner within the vehicle but also provides for structural confidence of the probe assembly when it is actuated to the extended position. Also, as shown in FIG. 2, the hinged beam assemblies 7 are alternately disposed with respect to the pitch arm assemblie 5 about the circumference of the collar and cylinder so as to enhance the even distribution of impact forces on the various components of the probe assembly.

Fixedly connected to the forward end of piston cap 22 is the probe head bar 24. The probe head bar is in turn threadedly connected to probe head 15. The head is characterized by a plurality (3) of apertures 73 which are equally radially disposed in equidistant manner from one another around the surface of the head. Protruding from each of the respective apertures is a capture latch or first latch means 75 which, as previously noted, are adapted to engage a cooperating surface on the drogue upon initial contact therewith. The capture latches are spring loaded so that any surface forces thereon depress them until they are moved into the cooperating recessed surface on the drogue whereupon the capture latches spring outwardly, thus coupling the vehicles together. Axially disposed within the probe head 15 is the capture latch release 79 which is adapted to be moved forwardly, that is towards the target vehicle, with respect to the capture latches 75. Manual actuation of the capture latch release 79 is effectuated through the connecting rod 79a which extends the length of the probe and into connecting engagement with a release handle 81. Intermediately disposed between the probe head 15 and piston cap 22 and in surrounding relation to probe head bar 24 is the axial attenuation spring 26. It will readily be recognized that the piston cap 22, bar 24, spring 26 and probe head 15 are of substantial unitary construction in that they move as a unit in response to release of the stored energy in spring 20.

Fixedly positioned on the side of cylinder 3 is a self-locking extension latch or second latch means 63 which is adapted to engage an integrally formed hook 65 on the side of piston cap 22. The purpose of latch 63 is to retain the probe in its fully retracted position against the stored energy exerted by spring 20. Actuation of the latch is accomplished by means of the torque shaft 69 which extends the length of the probe assembly to handle 71 on the end thereof. The torque shaft 69 may be supported through a plurality of bored ridges (not shown) which are integral with the primary collar and which serve to support the shaft when torque is applied to handle 71. Retraction of the probe assembly may be accomplished either automatically or manually. The automatic retraction system is accomplished by actuation of nitrogen pressure cartridges which are housed in actuator assembly 82. The actuator assembly is mounted internally of the piston so as to communicate with the interior thereof and with the annular cavity defined by the radial flange 3b, forward surface 17b of flange 17a, and the external and internal surface walls of the piston and primary collar respectively. The fluid pressure is transmitted from the piston interior to the annular cavity by means of a bored conduit 84 which extends from the rearward wall of the cylinder, and internally along the longitudinal wall thereof and into the cavity at entrance 86. It may thus be visualized that upon actuation of the pressurized system, fluid is transmitted to the cavity so that the pressure therein acts against the walls defining the cavity thereby expanding the volume, pushing the piston rearwardly into the cylinder and thereby retracting the probe assembly.

Retraction of the probe assembly may also be effected by a ratcheting assembly, generally indicated at 90. Additionally, however, the ratchet assembly provides a hand hold for carrying the probe assembly, assists in installing the probe assembly, and performs the ratcheting operation that slides the primary collar 1 forward in order to extend the probe pitch arm assemblies 5 and the support structure consisting of the hinged beam assemblies 7. Basically the ratchet assembly 90 comprises a ratchet rack 87 which is integrally connected at one end 89 to the forward portion of the cylinder 3, and at its other end 91 to the rearward portion of the cylinder. Fixedly attached to the primary collar and in bridging relationship to the ratchet rack 87 is a ratchet mechanism 93. Appropriately mounted in the ratchet mechanism are spring loaded ratchet teeth for engaging the rack and for moving the cylinder relative to the primary collar. Sequential movement of the ratchet mechanism or collar with respect to the rack and cylinder is accomplished by the pivotally mounted jacking bar 95 which has at its respective ends the handles 97, 99. With reference now particularly to FIG. 1, there follows a description of the installation of the probe assembly, operation of the probe assembly for accomplishing docking of the vehicle, and removal of the probe assembly subsequent to achievement of the docking.

The configuration of the probe assembly when in its stowed condition is such that the primary collar 1 is longitudinally displaced with respect to the cylinder 3. Specifically the collar will have been displaced rearwardly towards the base 3a of the cylinder. As may be visualized from FIG. 1, such relative movement would cause the radial distance to pivot pin 23 to be reduced and the relative position of the attenuator assembly 37 would be more towards horizontal than as presently indicated. Similarly, the tripod support structure typified by the hinged beam assembly 7 would be partially collapsed so that the radial distance to shoulder 57 is substantially decreased in order to permit removal or installation of the probe assembly. Thus the overall configuration of the device when in its stowed condition is such that the hinged beam assemblies 7 of the tripod support structure are pointing forwardly at an angle of about 30° with respect to horizontal, while the pitch arm assemblies 5 are characterized by approximately a 90° included angle between the main beam 19 and the tension links 27. In installing the probe assembly it is lifted into position and held in approximately a central location while the ratchet handle 97 is worked over approximately a 30° stroke so as to draw the primary collar 1 towards the cylinder 3. As this occurs the hinged beam assemblies 7 of the supoprt structure are expanded outwardly as are the pitch arm assemblies 5. The ratcheting procedures is continued until the locking shoulders 57 of the hinged beams move into engagement with the cooperating shoulders (not numbered) of the pursuant vehicle, see FIG. 1 and FIG. 2. It will be recognized that the cylinder and piston mechanism of the probe assembly are, during this time, locked in a charged condition by latch 63.

In operation, the pilot maneuvers the pursuit vehicle into an initial closing position with respect to drogue assembly 101. At the appropriate time the torque handle 71 is rotated so as to release latch 63, thus permitting the stored energy in spring drive 20 to cause extension of the probe head 15 a distance of approximately 10 inches. Subsequent maneuvering brings the probe head into initial contact with the drogue. Due to the funnel shaped configuration of the drogue 101, the probe head is guided towards the apex thereof until the spring loaded capture latches engage and lock into the mating capture ledge 103 of the drogue 101. Guidance of the probe head to this capturing position is enhanced by reptitive contact of the beam sections 19 with the drogue 101. The relative angles of the beam section structure with the drogue is such as to persistently direct the probe head toward the center of the drogue where the latching is to occur. When the probe engages the drogue through the capture latches, the probe retract system is activated from within the pursuit vehicle so as to release pressurized nitrogen or other gas into the piston base and through bored conduit 84 and hence into the annular cavity between primary collar 1 and cylinder 3. This, as previously explained, causes retraction of the probe head which in turn brings the two vehicles into abutting contact along the mating surfaces 105, 107 of each the target and pursuit vehicles respectively. At such time a plurality of automatic locking devices may be provided so as to fixedly couple the two bodies with respect to each other.

It will be recognized that, during the docking procedure, the tension links 27 will transmit the pitch arm loads and torque loads to the cylinder 3 in the event of any axial displacement. Together, the pitch arm and tension links induce the required kinematics causing compression of the shock attenuation assemblies 37, thereby reducing the loads necessary to meet the docking requirements. After the actual physical docking is achieved, personnel in either the target or pursuit vechicle may proceed to remove the probe by operation of the ratchet assembly 90. As shown in FIG. 1, the handles 99 and 97 are provided for this purpose so that the primary collar 1 can be ratcheted in an axial direction opposite from that of the movement of cylinder 3. In so doing the support structure consisting of the hinged beam assemblies 7 are caused to partially collapse thereby enabling removal of the entire probe assembly into either of the two vehicles. After the probe assembly is removed there is of course revealed a passageway between the two vehicles which enables occupants to move from one vehicle to the other.

It should be understood that the drawings and specification set forth hereinabove present a detailed disclosure only of a preferred embodiment of the invention and that therefore the invention is not to be limited by the specific form disclosed, but covers all modifications, changes and alternative constructions and methods falling within the scope of the principles taught herein.

That which is claimed and desired to be secured by U.S. Letters Patent is:

1. A portable probe assembly for use by a first body in capturing and coupling a second body thereto so as to effect an integral union between the two comprising:

probe head means for contacting a reception area on the second body, said probe head means being secured to radially confined, axially extendable and retractable means for supporting it with respect to said first body, first latch means operatively disposed on the surface of said probe head means for engaging a cooperating surface on the reception area of the second body, a first means operatively connected to said extendable and retractable means for causing extension thereof prior to contact of said probe head means with the second body, and a second means operatively connected to said extendable and retractable means for causing retraction thereof after said first latch means has engaged the reception area of the second body and thereby drawing the bodies toward one another and into abutting relation.

2. The assembly of claim 1 wherein said extendable and retractable means is slidably disposed within a cylinder means that is removably secured to said first body, shock attenuation means operatively disposed between said extendable and retractable means and said cylinder means for reducing both axially and randomly directed structural loads occurring on impact with the second body.

3. The portable probe assembly of claim 2 wherein said first means includes stored energy disposed in the assembly so as to urge said extendable and retractable means toward the extended position, a second latch means operatively associated with said cylinder means and extendable and retractable means for retaining the latter in a normally retracted position with respect to the former so that upon release of said second latch means the stored energy in the assembly causes said extendable and retractable means to extend.

4. The assembly of claim 2 wherein said shock attenuation means includes a plurality of energy absorbing beam members, each of said beam members having one end thereof linked to said cylinder means and the other end thereof pivotally secured to said extendable and retractable means.

5. The assembly of claim 4 wherein said energy absorbing beam members are uniformly arranged with respect to one another so as to equally attenuate in all directions the randomly directed loads, said shock attenuation means for reducing axially directed loads including resilient means disposed within said cylinder means.

6. The assembly of claim 1 including collar means, slidably connected to the extendable and retractable means, beam support means hingedly connected to said collar means so that movement of said collar means towards said probe head means causes engagement of the other end of said beam support means with cooperating means on the first body.

7. The structure of claim 6 wherein said assembly further includes removal means operatively connected to said beam support means for moving said beams out of engagement with the first body thereby freeing the assembly so as to allow the removal thereof.

References Cited

UNITED STATES PATENTS

| | | |
|---|---|---|
| 1,031,663 | 7/1912 | Pavia et al. _____ 213—95 |
| 3,201,065 | 8/1965 | Dunn. |
| 3,300,162 | 1/1967 | Maynard et al. |
| 3,367,515 | 2/1968 | Clejan et al. _____ 213—8 X |
| 3,391,881 | 7/1968 | Maltby. |

OTHER REFERENCES

Satrac—Space Rendezvous System; Astronautics magazine; June 1961; pp. 32–33, 44 and 46

Fuel Transfer System Permits Rapid Coupling; NASA Tech. Brief 68–10039; February 1968.

MILTON BUCHLER, Primary Examiner

J. L. FORMAN, Assistant Examiner

U.S. Cl. X.R.

213—95